F. STINSON.
CAGE FOR ROLLER BEARINGS.
APPLICATION FILED JAN. 16, 1919.
1,410,040. Patented Mar. 21, 1922.
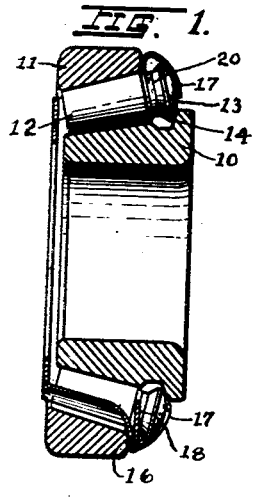
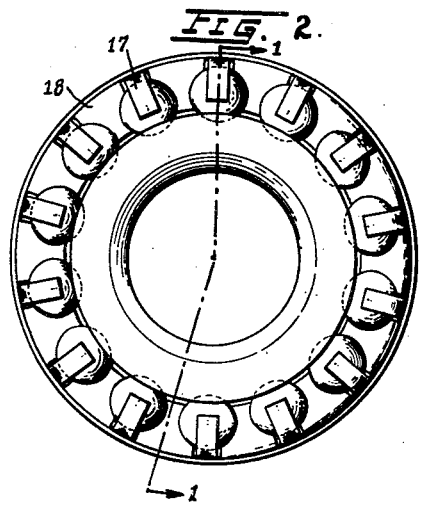
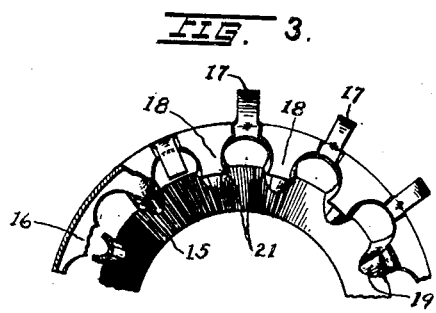
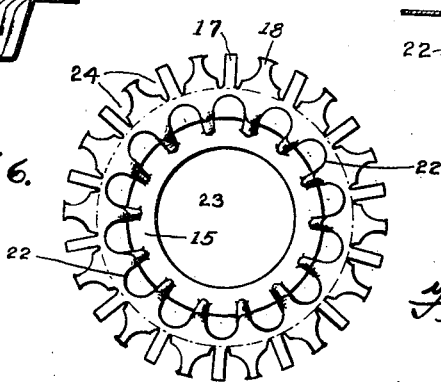
Floyd Stinson
Inventor
By
Attorney

UNITED STATES PATENT OFFICE.

FLOYD STINSON, OF CLEVELAND, OHIO, ASSIGNOR TO THE STANDARD PARTS COMPANY, OF CLEVELAND, OHIO, A CORPORATION OF OHIO.

CAGE FOR ROLLER BEARINGS.

1,410,040.  Specification of Letters Patent.  Patented Mar. 21, 1922.

Application filed January 16, 1919. Serial No. 271,385.

*To all whom it may concern:*

Be it known that I, FLOYD STINSON, a citizen of the United States, and a resident of Cleveland, county of Cuyahoga, State of Ohio, have invented certain new and useful Improvements in Cages for Roller Bearings, of which the following is a specification.

This invention relates to cages for roller bearings and especially to cages for taper roller bearings.

One of the objects of the invention is to provide a simple cage construction which may be formed from a single piece of metal and which will so hold the rollers as to constitute a separate unit from the cup and cone of the bearing. Another object of the invention is to provide a cage of the type referred to which will be rigid and which may be economically manufactured.

Other objects and the features of novelty will be apparent from the following description taken in connection with the accompanying drawings, of which:

Figure 1 is a longitudinal section through a taper roller bearing, embodying the invention;

Figure 2 is an end view;

Figure 3 is a perspective view of a fragment of the cage with certain parts broken away and other parts shown out of their normal positions;

Figure 4 is a longitudinal section through a cage in an early stage in its manufacture;

Figure 5 is a view similar to Figure 4, but showing later stage; and

Figure 6 is a prospective view of a cage after the completion of the punching operations.

Referring to the drawing, 10 indicates the bearing cone and 11 the cup between which there is the usual series of rollers 12. The bearing illustrated is provided with a ball head 13 which contacts with a conical surface 14 on a flange of the cone, this bearing being well known to those skilled in the art as the Bock bearing.

This invention concerns the cage which holds the rollers 12 in their proper spaced relation and also carries the rollers so as to form therewith a unit distinct from the cone 10 and cup 11. The cage consists of a radial flange 15 at the small end of the cone and a flange 16 at the large end on the outer periphery of which there are inwardly turned tongues 17 and 18 for holding the rollers in position. The flanges 15 and 16 are connected by channel shaped bridging members 19 between the rollers and which serve to circumferentially space the rollers. It will be observed from Figure 1 that the rollers are necked down at the inner side of the ball head, as indicated at 20, and the tongues 18 are so formed as to engage the necked part of the roller, the points 21 holding the rollers in position. After the rollers are put into various pockets in the cage, the tongues 17 are thrown down from the position shown in Figure 3 to the position shown in Figure 2, where they are over the ball end of the roller.

The cage, as described and illustrated, is made by first forming, by means of dies, a cup having corrugated side walls and outwardly extending flange at the large end and a bottom, from which the flange 12 is formed, as illustrated in Figure 4. The openings 22, for the rollers, are then formed, and then the opening 23 is formed in the bottom, and the flange notched as indicated at 24, these notches forming the tongues 17 and 18, as will be readily understood from Figure 6. The tongues 18 are turned into the position shown in Figures 2 and 3 and then the rollers are inserted and the tongues 17 bent over the ball end of the roller, thus completing the unit.

Having thus described my invention, what I claim is:

1. A roller bearing cage, for rollers having necked down portions, comprising flanges at the ends and bridging members between the rollers connecting the flanges, inwardly turned tongues on the flange at one end of the cage adapted to engage the necked down portion of said rollers to retain the latter in the cage, and other tongues adapted to extend over the ends of the rollers.

2. A roller bearing cage, comprising a conical cup having flanges at its ends and channel-shaped members connecting the flanges, tongues on the periphery of one flange cooperating with the rollers to hold the latter in the cage, and other tongues extending over the ends of the rollers.

3. A roller bearing cage, comprising a conical cup having flanges at its ends and bridging members which space the rollers and connect said flanges, spaced tongues on the periphery of one flange turned inward and cooperating with the rollers to hold them in place and other tongues on said periphery between the first-mentioned tongues and extending over the ends of the rollers.

4. A roller bearing cage, for rollers having necked down portions, comprising flanges at the ends and bridging members between the rollers connecting the flanges, inwardly turned tongues on the flange at one end of the cage adapted to engage the necked down portion of said rollers to retain the latter in the cage.

In testimony whereof I affix my signature.

FLOYD STINSON.